April 9, 1935.   G. E. A. HALLETT   1,996,807
VALVE GEAR FOR OPERATING DUAL VALVES
Filed Sept. 25, 1933
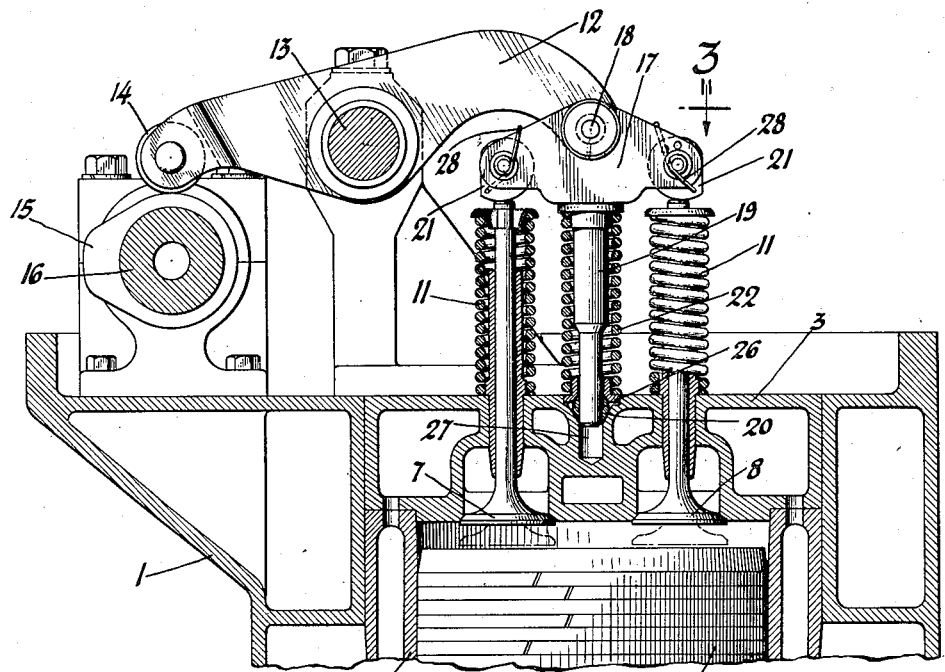
Fig. 1
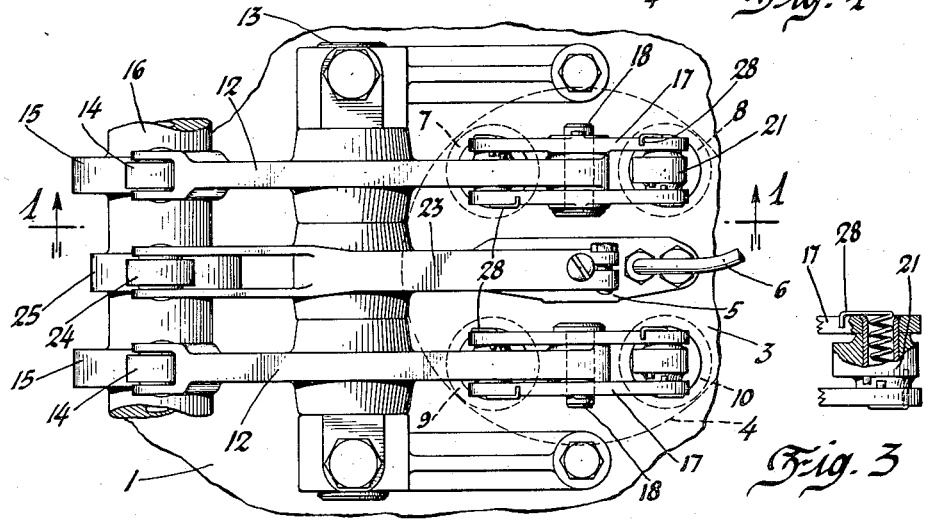
Fig. 2
Fig. 3
Inventor
George E. A. Hallett
By Blackmore, Spencer & Flint
Attorneys Patented Apr. 9, 1935

1,996,807

UNITED STATES PATENT OFFICE 1,996,807

VALVE GEAR FOR OPERATING DUAL VALVES

George E. A. Hallett, Detroit, Mich., assignor, by mesne assignments, to General Motors Corporation, Detroit, Mich., a corporation of Delaware Application September 25, 1933, Serial No. 690,809

13 Claims. (Cl. 123—90)

This invention relates to engine cylinders or the like having a plurality of ports controlled by separate valves adapted to be opened and closed in unison, and to means for operating a plurality of the valves—each having automatic means for taking up slack between the valves and their operating means—from a single rocker arm.

In particular, it is applicable to internal combustion engines in which the desirable unrestricted flow of air or gas to or from the combustion chamber is provided for by separate mushroom type valves at a plurality of points in the cylinder head. Such valves can be arranged symmetrically to provide for an even flow to or from the cylinder without interfering with the remaining structural requirements of the cylinder head in a manner which is not always practicable with a single larger valve which would otherwise be required.

It has previously been proposed to operate a plurality of such valves from a single rocker arm whereby the valves will open and close simultaneously.

According to the present invention, a driving means is provided for operating at least two valves from a single rocker arm with means providing for the use of self-adjusting valve lash or slack adjusters for each valve stem of the type shown in U. S. patent application Ser. No. 565,277, filed September 26, 1931, (Patent No. 1,950,590, issued March 13, 1934). Such valve lash adjusters require that the parts between which they are placed have a valve operating motion in intersecting directions.

The required valve operating motion is provided in those constructions in which a yoke common to two valves has its movement controlled by a parallel motion linkage in which one of the links may be a conventional valve operating rocker arm. According to the present invention, however, the yoke is pivotally connected to the rocker arm, but at a point removed therefrom, is guided not by another link but by a self aligning guide bearing oscillating in a stationary part, thereby effecting a simplification and economy of parts in eliminating one link and one pivotal connection while providing a structure whose movement is more rigidly controlled. It will be apparent that when the yoke is supported between the floating ends of a parallel motion linkage it cannot be so positively guided as to have always the same motion, while there is one additional pivotal connection in which wear and play may develop as compared with the present invention.

The object of the invention is to provide an operating gear of the type in which at least two valves are operated from a single rockshaft in which these valves are opened substantially simultaneously and in which each valve stem is actuated directly through a valve lash adjuster of the aforementioned type while the valve operating means is positively guided so as to have always the same motion in a resultant direction other than parallel with any of the axes of the valves on each actuating movement and capable of operating any of the valves properly in the event of breakage or sticking of the other valves.

It is another object of the invention to provide an operating gear of the type described, which will have a minimum of parts and be light in weight, thus lessening the inertia of the reciprocating masses while being strong and rigid.

The foregoing and other objects of the invention, which will be apparent from the description, are attained as is hereinafter described.

The drawing shows the application of the invention to a conventional two-cycle Diesel engine having inlet ports (not shown) in the cylinder wall, controlled by the working piston, and four exhaust valves in the cylinder head arranged symmetrically around an injection valve centrally disposed in the cylinder head.

In the drawing

Figure 1 is a vertical section on the line 1—1 of Figure 2, showing one cylinder of a two-cycle Diesel engine with exhaust valves and valve operating gear according to the invention.

Figure 2 is a plan view.

Figure 3 is an enlarged part-sectional view in the direction of arrow 3 of Figure 1 showing an automatic valve lash adjuster of the type shown in U. S. application Ser. No. 565,277 (Patent No. 1,950,590, issued March 13, 1934) embodied in the invention.

The engine cylinder block 1 is provided with a water jacketed liner 2 to which is bolted the cylinder head 3. 4 is the engine piston which reciprocates in the liner 2.

Mounted centrally of the cylinder head is a combined fuel pump and fuel injection valve 5 to which fuel is supplied through a pipe line 6.

The exhaust valves 7, 8, 9, and 10 of mushroom type are symmetrically disposed in the cylinder head around the injection valve 5. Each of the valves 7, 8, 9, and 10 is provided with a spring 11 tending to hold the valve on its seat.

Rocker arms 12 pivoted on a shaft 13 and provided with a roller 14 are rocked by cams 15 on a cam shaft 16.

Each rocker arm serves to open two valves 7, 8 or 9, 10 simultaneously at the proper time through the medium of a yoke or bridge piece 17 pivotally mounted at 18 in the valve actuating end of the rocker arm and having a stem 19 guided in a ball and socket type of guide bearing 20 in the cylinder head. The ball is capable of angular oscillation or universal movement about its center.

The ends of the yoke 17 do not act directly on the valve stems, but downward valve opening motion of the bridge piece is communicated to the valve stems through the medium of self adjusting cam type valve lash adjusters 21 mounted in the ends of the bridge piece 17.

The ball and socket type of bearing 20 forms a guide for the sliding reciprocating movement of the stem 19 of the yoke 17 while at the same time permitting of the circumferential movement of the pivot 18 of the yoke in an arc of a circle about the shaft 13, and the combined sliding and slight angular oscillating movement of the stem 19 in the bearing 20.

It will be seen that as a result of the movement in an arc of a circle of the pivot 18 about the shaft 13 the yoke 17 does not move in a direction wholly parallel with the axes of the valve stems, but has a slight motion in a direction transverse to the axes of the valve stems which is sufficient to provide for the requisite "wiping" action of the lash adjusters across the ends of the valve stems necessary to the functioning thereof, without affecting the substantially simultaneous synchronous opening and closing movement of the valves themselves.

The yoke and the valves between which the lash adjusters are mounted have intersecting directions of motion.

It will be noted also that since the yoke is pivotally carried between two spaced supporting and guiding points, its movement is uninfluenced by any possible deflections as a result of forces due to the load thereon as might be the case with a single supporting and guiding bearing.

A spring 22 surrounding the yoke stem 19 tends to lift the yoke 17 clear of the valves, relieving the actual valve springs of any duty other than that of returning the valves to their seats and enabling a better functioning of the lash adjusters in taking up clearance between the yoke 17 and the valve stems, when the valves are closed. Each valve gear for two valves is thus provided with a spring for each valve and a third spring for the yoke. Together, in combination, the springs maintain the rocker arm with its roller 14 in contact with the cam 15.

The plunger (not shown) of the unit fuel pump and fuel injection valve 5 is actuated by a rocker arm 23 pivoted on the shaft 13 between the rocker arms 12 for the valves 7, 8 and 9, 10. The rocker arm 23 is provided with a roller 24 and is rocked by a cam 25 on the cam shaft 16.

The whole arrangement enables a compact and symmetrical arrangement of the valves in the cylinder head without interference with the central disposition of the injector, and since there are in effect six coil springs for the four valves, these are of smaller diameter than would otherwise be necessary, further facilitating the disposition of the parts to give adequate valve area and room for the combined fuel pump and injector which has its rocker arm disposed on the same fulcrum and between the two rocker arms for the four valves of a cylinder.

The valve lash or slack adjusters consist of spiral cams 21 resiliently urged in the direction of increasing steepness of their contour by springs 28. Their spiral slope is such that they are self-locking under the operating pressure. They function by sliding over the end of the valve stem without rotation on their pivots or by rolling over the end of the valve stem with rotation about their pivotal points on each opening and closing movement of the valves. The sliding or rolling action always takes place in the direction of lessening steepness of their contour thereby introducing "potential" lash or slack by what might be termed "backing up" of the cams. This "potential" lash or slack becomes an actual reality after the valves are seated, but is taken up in each cycle during the non valve operating part of the movement of the yoke, by rotation at that time of the cams 21 by the springs 28 in the direction of increasing steepness of the cam contour to take up the slack.

In this way "potential" slack is introduced between the valves and the bridge piece during the operation of the valves and the "actual" slack is taken up while the valves are seated. The cams thus eliminate all play and accommodate themselves to the varying effects of wear and expansion on the individual valve stems.

As indicated in Figure 1, the ball and socket guide for the stem 19 of the yoke or bridge piece 17 consists of a ball 20 having a seating in the cylinder head and a bushing 26 forming a cover with a spherical seating for the ball and retained in position by the spring 22. Sufficient clearance is provided between the stem 19 and the bushing 26 and in a pocket 27 below the ball guide to permit of the up and down movement of the stem 19 with the requisite small angular oscillating movement of stem 19 in an arc of a circle about the center of the ball.

It will be appreciated that while in the preferred embodiment the slack adjusters have been mounted on the yoke, the invention would function equally well with the lash adjusters mounted on the valve stems, and that, further, the invention is not limited to its combination with the particular type of slack adjusters described and illustrated. It is equally applicable wherever the functioning of the slack adjusters requires that the yoke and the valve stems or connections thereto have a valve operating motion in intersecting directions.

It will also be appreciated that while in the embodiment illustrated a rocker arm operates a yoke for two valves, a single rocker arm might operate a yoke for any number of valves greater than two. The invention is not limited to any particular kind of valve or to any particular number or disposition of the valves.

I claim:

1. In combination, a cylinder with two or more valves, an operating yoke therefor and common thereto, automatic valve lash adjusters for each valve between the yoke and the valves or connections thereto, means providing for operating movement of the operating yoke in a direction intersecting the direction of motion of the valves or the aforesaid connections thereto whereby an automatic adjusting movement of the lash adjusters is effected, said means comprising a rocker arm to which the yoke is pivotally connected and a self aligning guide bearing cooperating with the pivotal connection and capable of angular oscillation about its own fixed center in a stationary part, the yoke having a stem portion slidable in the guide bearing, whereby the aforesaid movement of the yoke is effected, and resilient means yieldably urging the yoke in a direction away from the valves.

2. In combination, a cylinder with two or more valves, an operating yoke therefor common thereto and pivotally connected to an actuating lever for the yoke, and means constraining the yoke to move in an identical manner on each actuating movement, irrespective of forces due to the load thereon, consisting of a stem portion of the yoke sliding axially through a self aligning guide bearing capable of angular oscillation about its own fixed center in a stationary part and spaced from the pivotal connection between the actuating lever and the yoke.

3. The combination according to claim 2 in which the oscillatable guide bearing consists of a ball having a seating in the cylinder head and having a bore therethrough constituting a bearing through which a stem portion of the yoke may slide with angular oscillation of the ball on its seating.

4. The combination according to claim 2 in which the oscillatable guide bearing consists of a ball having a seating in the cylinder head and having a bore therethrough constituting a bearing through which a stem portion of the yoke may slide with angular oscillation of the ball on its seating, and in which the yoke is yieldingly urged towards the valve closing position by spring means having a seating on the ball.

5. In combination, a cylinder with two or more valves, an operating yoke therefor and common thereto, automatic valve lash adjusters for each valve between the yoke and the valves or connections thereto, means providing for operating movement of the operating yoke in a direction intersecting the direction of motion of the valves or the aforesaid connections thereto whereby an automatic adjusting movement of the lash adjusters is effected, said means comprising a rocker arm to which the yoke is pivotally connected and a self aligning guide bearing cooperating with the pivotal connection and capable of angular oscillation about its own fixed center in a stationary part, the yoke having a stem portion slidable in the guide bearing, whereby the aforesaid movement of the yoke is effected.

6. The combination according to claim 5 in which the guide bearing consists of a ball having a seating in the cylinder head and having a bore therethrough constituting a bearing through which a stem portion of the yoke may slide with angular oscillation of the ball on its seating.

7. In combination, a cylinder with two or more valves, an operating yoke therefor and common thereto, automatic valve lash adjusters for each valve between the yoke and the valves or connections thereto, means providing for operating movement of the operating yoke in a direction intersecting the direction of motion of the valves or the aforesaid connections thereto whereby an automatic adjusting movement of the lash adjusters is effected, said means comprising a rocker arm to which the yoke is pivotally connected, and a self aligning guide bearing consisting of a ball having a seating in the cylinder head and having a bore therethrough constituting a bearing through which a stem portion of the yoke may slide with angular oscillation of the ball on its seat, and means whereby the yoke is yieldingly urged towards valve closing position by means additional to the valve springs.

8. In combination, a cylinder with two or more valves, an operating yoke therefor common thereto and pivotally connected to an actuating lever for the yoke, and means constraining the yoke to move in an identical manner on each actuating movement irrespective of forces due to the load thereon, said means comprising a stem portion of the yoke sliding axially through a self aligning guide bearing consisting of a ball spaced from the pivotal connection between the actuating lever and the yoke having a seating in the cylinder head and capable of angular oscillation about its own fixed center therein, and means whereby the yoke is yieldingly urged towards the valve closing position by means additional to the valve springs.

9. The combination according to claim 5 in which the oscillatable guide bearing consists of a ball having a seating in the cylinder head and having a bore therethrough constituting a bearing through which a stem portion of the yoke may slide with angular oscillation of the ball on its seating, and in which the yoke is yieldingly urged towards the valve closing position by spring means having a seating on the ball.

10. The combination according to claim 2 in which the guide bearing has a seating in the cylinder head, the guide bearing being held on the seating by resilient means.

11. The combination according to claim 2 in which the guide bearing has a seating in the cylinder head, the guide bearing being held on the seating by resilient means reacting on the yoke and yieldingly urging the latter towards the valve closing position.

12. The combination according to claim 5 in which the guide bearing has a seating in the cylinder head, the guide bearing being held on the seating by resilient means.

13. The combination according to claim 5 in which the guide bearing has a seating in the cylinder head, the guide bearing being held on the seating by resilient means reacting on the yoke and yieldingly urging the latter towards the valve closing position.

GEORGE E. A. HALLETT.